United States Patent
Tamura

(10) Patent No.: US 8,791,385 B2
(45) Date of Patent: Jul. 29, 2014

(54) HIGH SPEED LASER SCRIBING METHOD OF FRAGILE MATERIAL

(75) Inventor: Yutaka Tamura, Uji (JP)

(73) Assignee: Lemi Co., Ltd., Takatsuki (JP)

( * ) Notice: Subject to any disclaimer, the term of this patent is extended or adjusted under 35 U.S.C. 154(b) by 598 days.

(21) Appl. No.: 12/417,112

(22) Filed: Apr. 2, 2009

(65) Prior Publication Data

US 2010/0089882 A1 Apr. 15, 2010

(30) Foreign Application Priority Data

Apr. 8, 2008 (JP) ................................. 2008-100887

(51) Int. Cl.
*B23K 26/36* (2014.01)

(52) U.S. Cl.
USPC ............ 219/121.69; 219/121.61; 219/121.76; 219/121.85

(58) Field of Classification Search
USPC ............... 219/121.6, 121.67, 121.68, 121.69, 219/121.7, 121.71, 121.72
See application file for complete search history.

(56) References Cited

U.S. PATENT DOCUMENTS

| | | | | |
|---|---|---|---|---|
| 3,453,097 A | * | 7/1969 | Hafner | 65/112 |
| 3,795,502 A | * | 3/1974 | De Torre | 65/174 |
| 4,546,231 A | * | 10/1985 | Gresser et al. | 219/121.72 |
| 5,084,604 A | * | 1/1992 | Dekker et al. | 219/121.72 |
| 5,132,505 A | * | 7/1992 | Zonneveld et al. | 219/121.6 |
| 5,154,334 A | * | 10/1992 | Dekker et al. | 225/2 |
| 5,603,853 A | * | 2/1997 | Mombo-Caristan | 219/121.64 |
| 5,609,284 A | * | 3/1997 | Kondratenko | 225/1 |
| 5,776,220 A | * | 7/1998 | Allaire et al. | 65/112 |
| 5,826,772 A | * | 10/1998 | Ariglio et al. | 225/2 |
| 5,915,316 A | * | 6/1999 | Tajima et al. | 112/470.05 |
| 6,023,039 A | * | 2/2000 | Sawada | 219/121.61 |
| 6,112,967 A | * | 9/2000 | Ostendarp et al. | 225/93.5 |
| 6,236,446 B1 | * | 5/2001 | Izumi et al. | 349/187 |
| 6,420,678 B1 | * | 7/2002 | Hoekstra | 219/121.75 |

(Continued)

FOREIGN PATENT DOCUMENTS

| JP | 2004155159 A | * | 6/2004 |
|---|---|---|---|
| JP | 2005-161361 | | 6/2005 |

(Continued)

OTHER PUBLICATIONS

Machine translation of JP 2004-155159, accessed Jan. 31, 2012.*

(Continued)

*Primary Examiner* — Mark Paschall
(74) *Attorney, Agent, or Firm* — Kratz, Quintos & Hanson, LLP

(57) ABSTRACT

In a method for scribing fragile material, a laser beam is irradiated onto a work plate of the fragile material. The work plate is heated by absorption of the irradiated laser beam and generating thermal stress by the heating. The laser beam is formed by a plurality of laser beam groups arranged along a beam scanning direction on a same line, and the plurality of laser beam groups are divided into two groups. One takes charge of initial heating and rising up temperature of the work plate, and another takes charge of temperature holding of the work plate. The laser beam intensity corresponding to each of the laser beam groups is adjusted so as to obtain optimum values.

By the method, it is possible to remarkably increase scribing speed of the work plate of the fragile materials without increasing heating temperature.

13 Claims, 5 Drawing Sheets

(56) References Cited

U.S. PATENT DOCUMENTS

| | | | |
|---|---|---|---|
| 6,541,730 B2 * | 4/2003 | Nam et al. | 219/121.67 |
| 6,653,593 B2 * | 11/2003 | Lizotte et al. | 219/121.7 |
| 6,744,009 B1 * | 6/2004 | Xuan et al. | 219/121.67 |
| 6,992,026 B2 * | 1/2006 | Fukuyo et al. | 438/797 |
| 7,423,237 B2 * | 9/2008 | Kusama et al. | 219/121.72 |
| 2003/0209528 A1 * | 11/2003 | Choo et al. | 219/121.72 |
| 2006/0151450 A1 * | 7/2006 | You et al. | 219/121.67 |

FOREIGN PATENT DOCUMENTS

| | | |
|---|---|---|
| JP | 2005-212364 | 8/2005 |
| JP | 3792639 | 4/2006 |
| TW | I266669 | 11/2006 |
| TW | I266669 | 11/2006 |

OTHER PUBLICATIONS

Taiwanese Office action dated Apr. 23, 2013, in the corresponding Taiwanese patent application No. 098111380.

Portions of translation of JP 2005-212364 (already of record) including claims, drawings and Correction or Amendment.

* cited by examiner

PRIOR ART

PRIOR ART

HIGH SPEED LASER SCRIBING METHOD OF FRAGILE MATERIAL

CROSS-REFERENCES TO RELATED APPLICATIONS

Not applicable

STATEMENT REGARDING FEDERALLY SPONSORED RESEARCH OR DEVELOPMENT

Not applicable

THE NAMES OF PARTIES TO A JOINT RESEARCH AGREEMENT

Not applicable

REFERENCE TO A SEQUENCE LISTING

Not applicable

BACKGROUND OF THE INVENTION (1) Field of the Invention

This invention relates to high speed laser scribing method of the fragile material such as fine glass used in flat panel display, quartz, ceramics or semiconductor. In order to simplify the explanation, the case of processing glass plate is represented below.

(2) Description of the Related Art

The cutting of fine glass plate used in flat panel displays which are in liquid crystal (hereafter abbreviated as LC) TV or plasma TV sets is presently performed using the conventional mechanical method, which is not free from various kinds of problems, such as the necessity of polishing, existence of a micro-crack layer, etc. The glass used in automobile, which is mostly round-shaped, requires polishing after the mechanical straight line cutting. Tempered glass used in architecture is difficult to cut mechanically and requires a new processing method.

Glass plate has been scribed until now using the mechanical method employing an ultra-hard tip such as a tip made of diamond. This method is accompanied by the following shortcomings. The first is the generation of cullet, which contaminates the glass surface. The second is the generation of micro-cracks in the processed area, which weakens the mechanical strength of glass. The third is the existence of kerf, which is as wide as a few hundreds µm in the smallest case and cannot be neglected in the processing of extremely small work chips. Other factors, such as the limit of processing speed and the cost of diamond tips, also cannot be neglected.

Different from the case of processing architectural glass plate, the scribing of fine glass plate such as that used in LC or plasma displays requires subsequent polishing and cleaning procedures for removing the micro crack zone.

On the other hand, the recently emerging laser scribing technology possesses the following advantages and is expected to eliminate the shortcomings possessed by the diamond tip method. The first is the cullet-free processing characteristics, so that a cleaning process is not required. The second is the absence of the generation of micro cracks, which results in high mechanical strength of the scribed area, so that subsequent polishing is not necessary. The third is the scribed surface, which is as perfect as a mirror-polished one. The fourth is the highly accurate shaping geometry, the error of which is smaller than ±25 µm. The fifth is ability to withstand the ever decreasing thickness of glass plate, which will find application in the future LC TV. Thus, the advent of the laser technology, which can improve the quality and broaden the range of processing, will be the solution to the various kinds of problem seen today.

Next, the principle of laser scribing is described. In the case of the irradiation of a very high power $CO_2$ laser beam on the glass surface, strong absorption of the beam takes place at the spot of the irradiation. The rapid local heating invites random and irregular but mostly radially distributed cracks, and a controlled straight line scribing in the desired direction cannot be realized.

When the laser beam intensity is low enough only to heat the glass surface gently and not to change its property nor to melt it, then the glass, while struggling to expand but being pushed back by the surrounding glass, undergoes concentric compressional stress. The compressional stress takes the maximum value at the beam center and decreases as the distance from the beam center increases. The compressional stress is transformed radially from the beam center toward surroundings in the glass plate with almost the speed of sound. As is known, when the compressional stress exists in a plate, a tensile stress is generated with its direction being tangential proportional to the Poisson ratio, which is illustrated in FIG. 1. In FIG. 1, curves of a radially directed stress $\sigma_x$ and a tangentially directed stress $\sigma_y$ are illustrated. The radially directed stress $\sigma_x$ is always a compression stress with negative value in FIG. 1 and the tangentially directed stress $\sigma_y$ is a compression stress at the beam center and changes into a tensile one apart from the beam center.

Between the compression stress and the tensile stress, the tensile stress is influential with scribing the glass plate. When the tensile stress exceeds a cleavage toughness, which is a characteristic value of the glass, uncontrollable destructions or breaks occur everywhere in the glass plate. In the laser scribing, the maximum value of the tensile stress is selected as being below the cleavage toughness of the material so that the uncontrollable destructions or breaks do not occur.

When a crack is provided at a position where the tensile stress occurs, the stress at its tip is magnified. In this case, when this magnified value is selected to be greater than the cleavage toughness, the crack tip will be cleaved further. As a result, the crack extends from its tip towards the beam center in such a manner that controlled scribing is generated and the scribing proceeds thereby. When the laser beam is scanned over the glass plate, the scribing proceeds on the straight line connecting the crack tip and the laser beam center. This is the controlled scribing, which is called "thermal stress scribing" of fragile material. This scribing is usually accelerated by applying a cooling procedure. The laser scribing yields scribed surfaces similar to cleavage surfaces of a crystal, such that no micro-crack or cullet is present.

U.S. Pat. No. 5,609,284 has been known as a typical patent for the laser scribing method for the glass plate. The patent describes that the glass plate is heated by an incident laser beam of radiation to a temperature short of its softening point, with the rate of relative displacement of the beam and of the glass plate, and the region of the heated zone which is locally cooled being selected to form a blind crack in the glass plate.

FIG. 2 shows a principal figure for the laser scribing method of the U.S. Pat. No. 5,609,284. A $CO_2$ laser beam is employed as the heating laser beam for the glass plate. The laser beam is scanned in a scanning direction 7. About 99% of the energy of the laser beam spot 1 of the $CO_2$ laser beam is absorbed at surface region of a glass plate 6 and not transmitted throughout the glass plate 6. This is a result of the extremely large absorption coefficient of the glass for the $CO_2$ laser light wavelength. As a result, heating of the glass plate occurs only at the surface region of the glass plate 6 and a compressional stress 4 is generated at the heated region of the glass plate. A point 3 apart from the heated region by the laser beam spot 1 is cooled by a suitable coolant. Then, a tensile stress 2 is generated, whereby a surface scribing 5 is generated behind the cooled point 3 which is extended from an initial crack 8.

The depth of the surface scribing 5 is usually no more than 100 μm if there exists an aid of thermal conducting towards depth direction in the glass plate 6. However, the glass plate 6 has such strong fragile characteristics that the glass plate 6 is breakable mechanically by applying bending stress in line with the surface scribing 5 of the glass plate. In order to separate the glass plate 6 completely, the application of a mechanical or bending stress on an un-scribed plane remaining underneath the surface scribing 5 is required. Here, the process for cutting the glass plate 6 completely by applying the mechanical or the bending stress in line with the surface scribing 5 is called "mechanical breaking".

In contrast to the case of the mechanical scribing, in which very poor processing quality is obtained, the laser scribing offers ideally high quality results both in laser scribed and mechanically broken layers. There is a clear boundary, however, seen microscopically between both the layers.

FIG. 3 shows a figure for the laser scribing method of Japanese Patent No. 3792639. The patent employs five points linear arrayed laser beam 9 instead of the laser beam 1 shown in FIG. 2, and a distance G between heating area H by the five points linear arrayed laser beam 9 and cooling point 3 is variable. The distance G may be determined experimentally as an optimum value and thereby breaking characteristics may be further improved.

FIG. 4 shows a figure of a beam splitter which explains a method for generating five points linear arrayed laser beam 9. A laser beam B emitted from a laser oscillator (not shown in FIG. 4) is transmitted into the beam splitter 14 through a non-reflective surface 11 thereof. Then, the laser beam B is partially reflected by a partial reflective surface 13 of the beam splitter 14 and split into an outgoing laser beam b1 and a partially reflected laser beam returned into the beam splitter 14. The partially reflected laser beam is reflected by a total reflection surface 10 of the beam splitter 14 and partially reflected again by the partial reflective surface 13 of the beam splitter 14 so as to split into an outgoing laser beam b2 and a partially reflected laser beam returned into the beam splitter 14 in a similar way. By repeating this process four times, five outgoing laser beams b1 to b5 are obtained. As a result, one incident laser beam B is converted into five outgoing laser beams b1 to b5 by the beam splitter 14.

Meanwhile, it is expected for practical application that the thermal stress scribing of the glass plate will be superior in manufacturing processing speed and processed quality in comparison with the conventional mechanical scribing method. The laser scribing method is far superior to the conventional mechanical scribing method in processed quality. In speeding up of the manufacturing processing speed, it is more important to speed up the scribing speed process itself than to shorten management times between each manufacturing process. When only the laser scanning speed is increased while keeping other conditions constant, the thermal stress generated by the laser beam is weakened because of dropped small lower irradiated energy thereof per unit time, so that the power for scribing the glass plate is also weakened. However, we supposed that even if the laser power is small, the laser energy power may not be lowered by controlling the laser beam spot to be very small, so that local heating temperature by the laser beam spot may not be lowered. Then, we tried to scribe the glass plate by scanning a very small laser beam spot at high speed. We came to a conclusion from the trial that it is impossible to increase the scribing speed for scribing the glass plate even if the local heating temperature is heightened by controlling the laser beam spot size to be very small.

We identified that the thermal stress generated by the laser beam depends on not the energy density but total energy added to the heating area.

Then we tried to increase both of the laser beam power and the laser beam scanning speed at the same rate, keeping the cross-section area of the laser beam constant. In this case, the laser beam energy incident to a unit area of the glass is maintained constant and therefore both of the thermal stress and breaking power are not decreased when increasing scanning speed. By this method, it is possible to increase the scribing speed. However, we cannot employ this method because the heating temperature of the glass is so increased that the glass is nondurable when applied to the flat panel display.

BRIEF SUMMARY OF THE INVENTION

It is therefore an object of the present invention to avoid above mentioned drawback of the laser beam scribing method of the glass or the fragile material such as fine glass used in flat panel display, quartz, ceramics or semiconductor and so on.

It is another object of the present invention to realize high speed laser beam scribing method of the glass or the fragile material using thermal stress scribing method.

According to the present invention, the laser beam scribing method of the glass or the fragile material makes it possible to increase scribing speed dramatically without increasing heating temperature of the glass or the fragile material.

The high speed laser beam scribing method of the present invention is that the cross-sectional figure of the laser beam is adjusted or optimized so as to have an elongate shape towards its scanning direction and increase the laser power and scanning speed thereof in proportion to the length of the laser beam of elongate shape towards scanning direction thereof. In this case, the amount of the laser beam energy and the time of laser emission to the unit area of the glass plate may be maintained constant and therefore the heating temperature is not varied. As a result, breaking performance will not deteriorate when increasing the scanning speed of the laser beam. This achieves scribing speed proportional to the laser beam length.

Furthermore, the breaking performance can be improved by adjusting the intensity distribution of the laser beam in the optimized shape of the figure thereof in addition to optimizing the figure of the laser beam as an elongate shape towards scanning direction thereof.

According to the present invention, the laser beam scribing method of fragile material comprising irradiation of an irradiating laser beam emitted from a laser oscillator onto a work plate of the fragile material, heating the work by absorption of the irradiating laser beam and generation of thermal stress arising from the heating, which exceeds the cleavage toughness of the material where the scribing is required, wherein the irradiating laser beam is configured by a plurality of laser beams in such a manner that the plurality of laser beams are arranged in line along the irradiating laser beam scanning line, and each of laser beam intensity of the plurality of laser beams is so adjusted as to control the irradiating laser beam intensity to make the most suitable intensity profile. This enables the obtaining of the best mode of laser beam intensity profile, and the scribing speed for scribing the glass or the fragile materials may be extremely increased.

The plurality of laser beams arranged in line along the irradiating laser beam scanning line are obtained by a group of a laser beams each of which is emitted from one of a plurality of individual laser oscillators.

The plurality of laser beams arranged in line along the irradiating laser beam scanning line may also be obtained by splitting single laser beam emitted from one laser oscillator into a plurality of laser beams using a beam splitter as shown in FIG. 4.

The irradiating laser beams constituted by the plurality of laser beams is classified or divided into two groups. One of the two groups handles initial heating and temperature rising mainly for the glass or the fragile materials, and another of the two groups handles temperature keeping. This is achieved by controlling laser beam intensity of the group for handling initial heating and temperature rising mainly having larger intensity profile in comparison with that of the group for handling temperature keeping mainly.

Each of the plurality of the laser oscillators is provided with a power meter monitoring laser output power, and the power meter controls the laser oscillator in such a manner that the laser output power of the laser oscillator is stabilized by a feedback loop.

Furthermore, it is possible to accelerate thermal stress scribing of the glass or the fragile materials by cooling a point which is backwardly located on the laser beam scanning line and apart from backward end of the heating area heated by the irradiating laser beam. Cooling is performed by spraying water or air to the cooling point.

Furthermore, it is possible to accelerate thermal stress scribing of the glass or the fragile materials by applying banding stress on opposite sides of the laser beam scanning line.

DETAILED DESCRIPTION OF THE INVENTION

Exemplary embodiments of the present invention are demonstrated hereinafter with reference to the accompanying drawings.

In the laser scribing technique of the glass plate by heating the glass plate with irradiating laser beam to the glass plate, it is necessary to increase the laser power and make the length of the laser beam to be long enough to maintain a long heating time. However, it is difficult to heat the glass plate effectively for scribing it by doing only the two items mentioned above, because the heating time for scribing the glass plate is inadequate because of the delay in temperature increase by the laser beam incident at beginning of heating area when high speed scanning.

To solve this problem, it is necessary to increase the irradiating laser beam intensity at beginning thereof, which requires an initial heating and temperature rising mainly. This is achieved by adjusting the laser beam intensity along the laser beam scanning direction.

According to the present invention, the irradiating laser beam is formed by a plurality of laser beams arranged in line along the laser beam scanning direction and adjusting laser beam intensities of each of the plurality of laser beams.

For example, two laser oscillators are provided. One of the two laser oscillators is provided for heating the glass plate for initial heating and temperature rising mainly, and another of the two laser oscillators is provided for heating the glass plate for holding temperature and penetrating heat into the glass plate from intermediate to end heating mainly, along the scanning direction of the glass plate.

Hereinafter, preferred embodiments of the present invention will be concretely described with referent to the drawings.

Figure 5A:
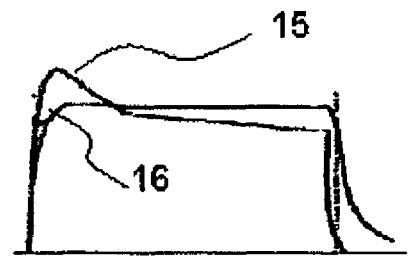
FIGS. 5A to 5C are laser intensity distributions and temperature distributions in a glass plate by the laser scribing method according to present invention.
Figure 5B:
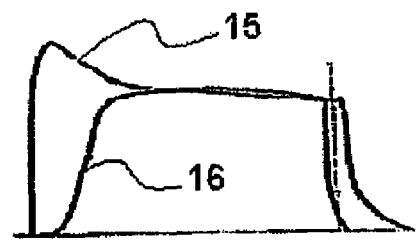
Figure 5C:
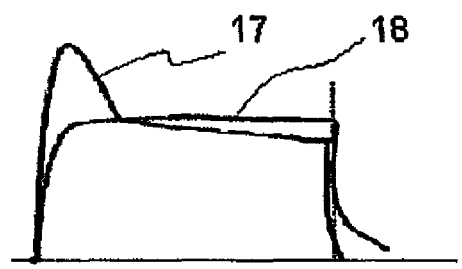

FIGS. 5A to 5C show laser beam intensity distribution figures for explaining the principle of the present invention. In FIG. 5A, the curve 15 shows the laser beam intensity distribution which is used in the present invention. The laser beam having this laser beam intensity distribution is scanned towards the left side in FIG. 5A with being irradiated on a static glass plate. The glass plate is heated from room temperature by the irradiated laser beam. The curve 16 in FIG. 5A shows the surface temperature distribution of the glass plate when irradiated by the laser beam. Instead of scanning the laser beam on the glass plate towards left side in FIG. 5A, the glass plate may be moved towards right side in FIG. 5A keeping the laser beam static. In fact, the laser beam may be moved relatively to the glass plate.

When the glass plate is heated by irradiating with the laser beam, the thermal energy of the laser beam is transferred to the glass plate and the surface temperature of the glass plate starts to rise from a room temperature to a predetermined temperature. In competition with this, the thermal energy transferred to the glass plate is gradually lost by thermal conduction in the glass plate and thermal emission from the surface of the glass plate. If there is thermal energy compensating for the lost thermal energy, the temperature of the glass plate may be kept constant. The laser beam intensity distribution 15 and the surface temperature distribution 16 in FIG. 5A illustrate these performances.

It is necessary, for the surface temperature distribution 16 of the glass plate to keep constant value of the predetermined temperature as well as possible, that the laser beam intensity distribution 15 maintain a large value when heating the glass plate from room temperature to the predetermined temperature, which requires an initial peak value in the laser beam intensity distribution 15. After the surface temperature of the glass plate reaches the temperature holding region of the surface temperature distribution 16, it is possible for the required laser beam intensity distribution 15 to decrease. When the laser beam intensity reaches zero, the surface temperature of the glass plate starts to drop down and returns to room temperature in good time. Then the glass plate is cooled by an appropriate coolant such as water or air, the surface temperature of the glass plate falls to a temperature less than the room temperature, and the tensile thermal stress is generated. The tensile thermal stress serves as a driving force to scribe the glass plate.

FIG. 5B shows a case when the scanning speed is increased under the above mentioned condition. When the scanning speed is increased, the input energy of the irradiated laser beam per unit time decreases, and the surface temperature distribution 16 of the glass plate delays in its rising time as shown in FIG. 5B. The substantially constant temperature at the temperature holding region of the surface temperature distribution 16 also decreases in accordance with decreasing the input thermal energy of the irradiated laser beam. However, it is less influenced in comparison with the initial delay in rising time of the surface temperature distribution 16. Therefore, it is required to make a large initial peak value in the laser beam intensity distribution 17 as shown in FIG. 5C to realize effective heating of the glass plate in high speed scanning mode as the low speed scanning mode. By making a large initial peak value in the laser beam intensity distribution 17 as shown in FIG. 5C, the surface temperature distribution 18 of the glass plate becomes substantially same as the surface temperature distribution 16 in the low speed scanning mode.

1. First Exemplary Embodiment

Figure 6:
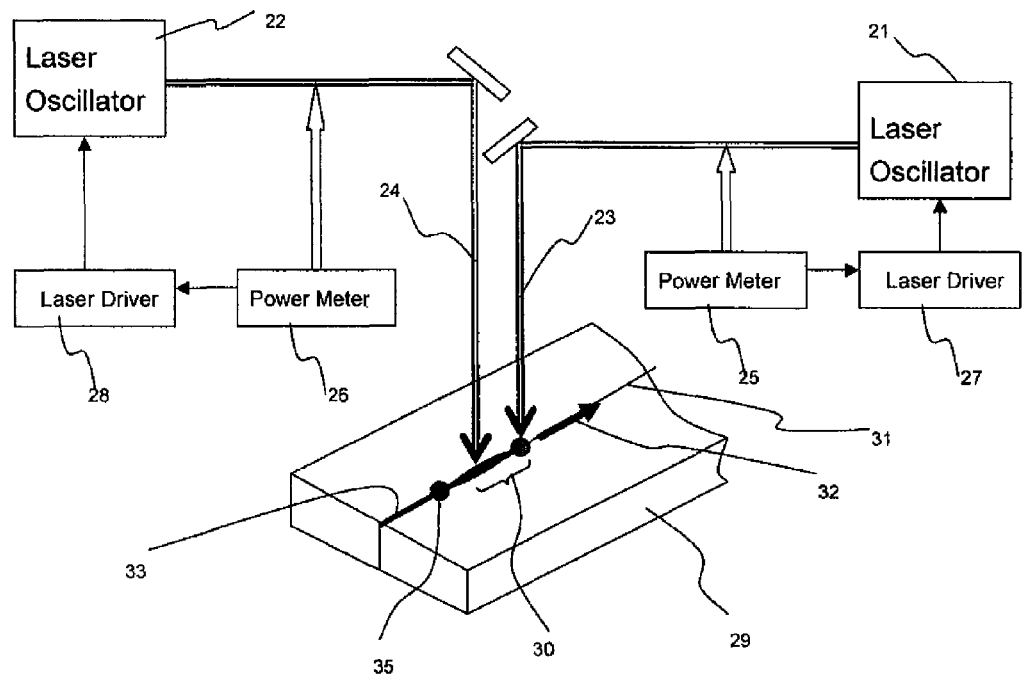
FIG. 6 is a schematic diagram explaining high speed laser scribing method of a glass plate according to the present invention.
Figure 7A:
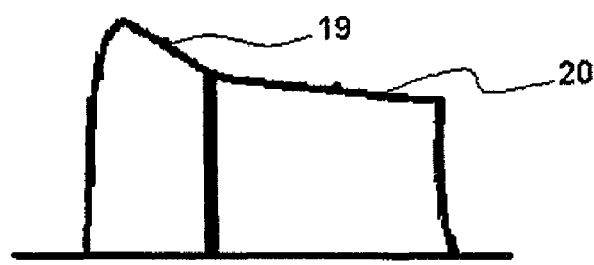
FIGS. 7A to 7C are laser intensity distributions and temperature distributions in a glass plate for explaining laser scribing method in an exemplary embodiment of the present invention.
Figure 7B:
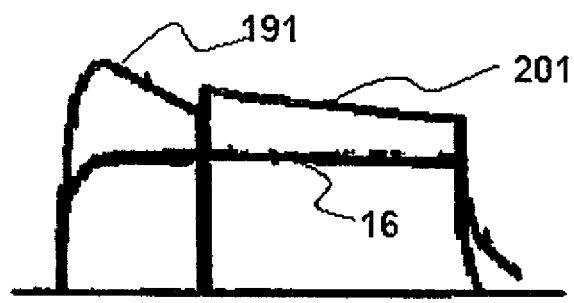
Figure 7C:
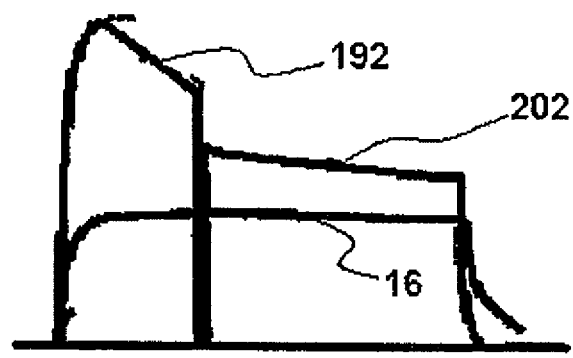

FIG. 6 is a schematic diagram explaining high speed laser scribing method of a glass plate according to the present invention. FIGS. 7A to 7C show the laser beam intensity distribution in a first exemplary embodiment according to the present invention.

In the first exemplary embodiment of the present invention, two laser beams 23, 24 emitted from two individual laser oscillators 21, 22 are employed as the irradiating laser beam for the glass plate. A $CO_2$ laser oscillator or CO laser oscillator is used as each of the two individual oscillators; the fragile materials such as glass plate are non-transparent at the wavelengths of these lasers. The laser beam 23 emitted from the laser oscillator 21 is appropriated as the one which heat the glass plate for initial heating and temperature rising mainly, and the laser beam 24 emitted from the laser oscillator 22 is appropriated as the one which heat the glass plate for holding temperature and penetrating heat into the glass plate.

Intensity distribution curves of each of the laser beams 23, 24 emitted from the two laser oscillators 21, 22 are shown in FIG. 7A as reference numerals 19 and 20. The two laser beams 23 and 24 are arranged in such a manner that they do not overlap with each other in tandem on a same line along the scanning direction when irradiated on the glass plate 25. The intensity distribution 19 of the laser beam 23 acts as the initial heating portion illustrated in FIG. 5A to 5C and FIG. 7A to 7C and the intensity distribution 20 of the laser beam 24 acts as the temperature holding portion illustrated in FIG. 5A to 5C and FIG. 7A to 7C. The initial heating portion corresponds to the initial peak of the laser intensity distribution 15, 17 in FIG. 5A to 5C. That is to say, the laser beam 23 is appropriated as initial heating laser beam for heating the glass plate, which acts as the initial peak operation in the laser beam intensity distributions 15, 17 in FIGS. 5A to 5C, and the laser beam 24 is appropriated as temperature holding laser beam for the glass plate, which acts as the temperature holding operation of the surface temperature distribution 16, 18 in FIGS. 5A to 5C, respectively.

Each of the laser oscillators 21, 22 has a power meter 25, 26 monitoring the output power of the laser oscillators 21, 22 respectively, and each of the laser oscillators 21, 22 is controlled by the observed data of the power meter 25, 26 via a driver circuit 27, 28 respectively. Each of the drivers 27, 28 receives the observed data from the power meter 25, 27, and adjusts each of the output power intensities of the laser oscillators 21, 22 individually with a feedback network including the power meter in response to scanning speed of the laser beams 19, 20 to the glass plate in order to stabilize the laser output power of the laser beams 19, 20 at the required power.

In particular, the intensity distribution 19 of the laser beam 23 from the laser oscillator 21 used as the initial heating laser so as to realize the initial peak shown in FIG. 7A, is higher than the intensity distribution 20 of the laser beam 24 from the laser oscillator 22 used as the temperature holding laser.

When a laser beam formed by the initial heating laser beam 19 and the temperature holding laser beam 20 are irradiated to the surface of the glass plate 29 and scanned along a scanning direction 32 along a line 31 to be scribed, the surface of the glass plate 29 is heated to an approximately-constant temperature as shown by the line of the surface temperature distribution 17. As a result, a crack based on a thermal stress is caused by the laser beam irradiation and the crack proceeds on the surface of the glass plate 29 in accordance with the scanning of the laser beam 30, so that a scribed line 33 is generated on the surface of the glass plate 29 along the laser beam scanning line 32. The crack also extends into depth direction of the glass plate by thermal conduction of the glass, and if the crack reaches to rear surface of the glass plate 29, the glass plate 29 may be broken along the scribed line 33. When the crack does not reach the rear surface of the glass plate 29, it is possible to break the glass plate 29 by applying a bending stress along the scribed line 33 of the glass plate 29.

Figure 1:
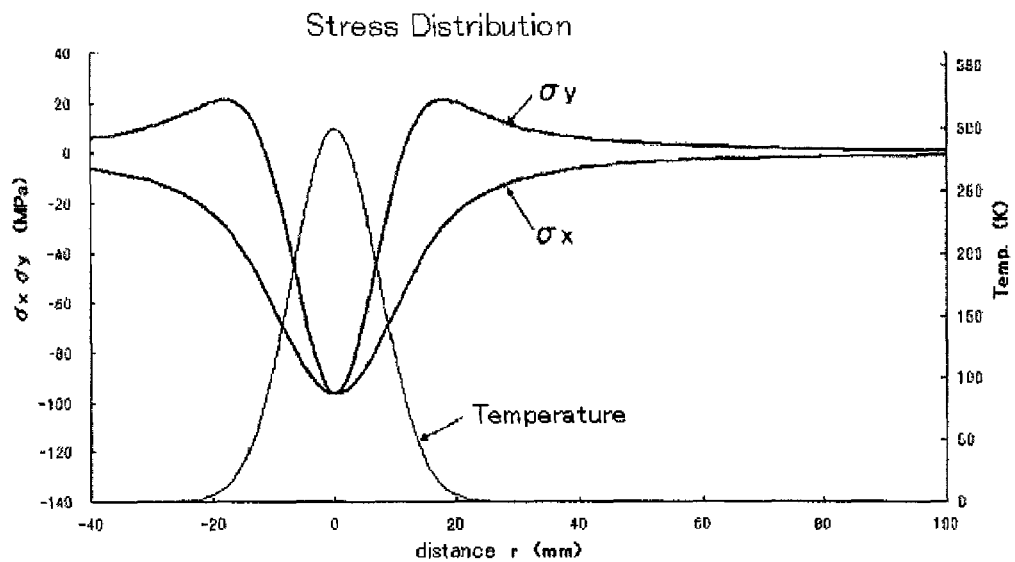
FIG. 1 is a curve of a radially directed stress component $\sigma_x$ and a tangentially directed stress component $\sigma_y$ in case when there is increase of temperature in Gaussian distribution having a center at original point, which explains a principle of generating thermal stress in the laser beam scribing method.
Figure 2:
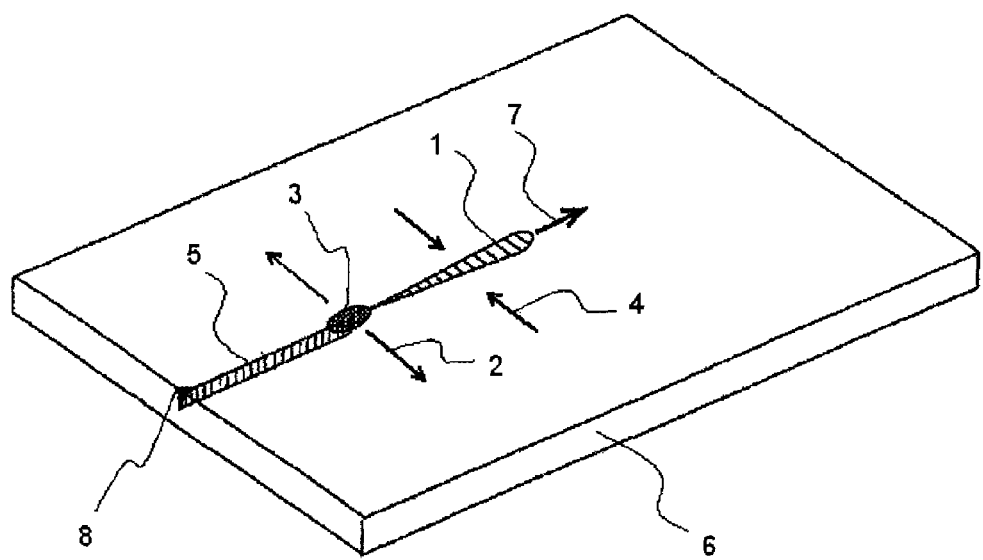
FIG. 2 is a perspective view showing a conventional surface scribing method of a $CO_2$ laser beam scribing of glass plate.

In this case, it is desired to cool a point 35 apart behind the heated region by the laser beam 30 by a suitable coolant, as previously described in FIG. 2. By cooling the point 35 apart behind the heated region, the generation of the scribed line 33 by the thermal stress is more accelerated.

FIG. 7B shows a laser beam intensity distribution figure in case of low speed scanning of the laser beam. In this case, even if the power energy intensity of the initial heating laser beam 191 is not so large relative to that of the temperature holding laser beam 201, it is possible to realize the desired nearly constant surface temperature distribution 16 of the glass plate. The control or the adjustment of the laser beam power intensity of the initial heating laser beam 19 or 191 is easily realized by the laser power controlling method using a feedback network, described above. The scribing operation is same as that of the case of FIG. 7A and therefore the explanation is omitted here.

FIG. 7C shows a laser beam intensity distribution figure in case of high speed scanning of the laser beam. This is most favorable mode of the present invention. In this case, the initial heating laser beam 192 is settled in sufficiently high power energy intensity in comparison with that of the temperature holding laser beam 202, which makes it possible to maintain the surface temperature distribution 16 of the surface of the glass plate in constant value. The regulation control of the laser beam intensity distributions for the initial heating laser beam 192 and the temperature holding laser beam 202 is achieved by aforementioned laser power output control method using feedback network. The scribing operation is same as that of the case of FIGS. 7A and 7B and therefore the explanation is omitted here.

According to the laser scribing method in case of employing a laser beam intensity distribution of FIG. 7C made by two $CO_2$ laser oscillators each having an output about 100 W output power, we have obtained a remarkably excellent result that a scribing speed of more than 800 mm/sec can be realized which is well over the scribing speed of 400 mm/sec in case of traditional single $CO_2$ laser.

In the description above, two laser oscillators 21, 22 are provided, and the laser beam 23 from the laser oscillators 21 is used as the initial heating laser beam, and the laser beam 24 from the laser oscillators 22 is used as the temperature holding laser beam. Instead of these, it is possible to provide a plurality of laser oscillators for the initial heating laser oscillator and temperature holding laser oscillator, respectively to obtain each of the initial heating laser beam and the temperature holding laser beam, respectively. Furthermore, it is also possible to provide a single laser oscillator where the output laser beam thereof is split so as to obtain a plurality of laser beams for distributing them as the initial heating laser beam and the temperature holding laser beam.

2. Second Exemplary Embodiment

Figure 3:
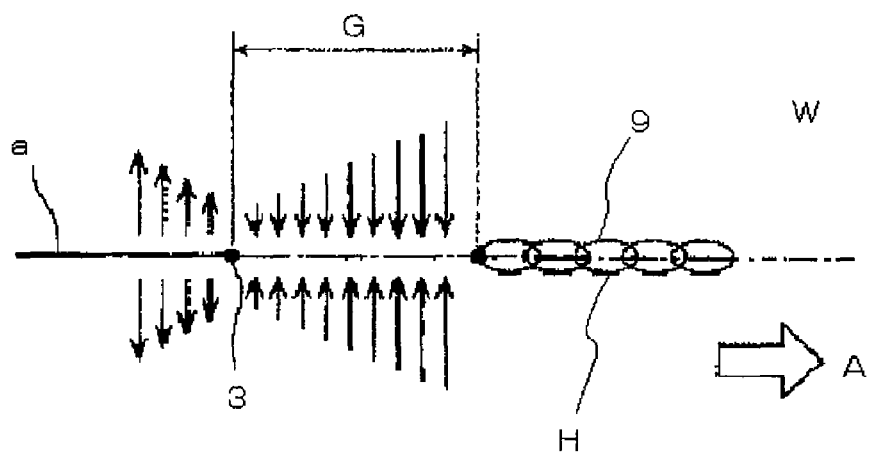
FIG. 3 is a plan view explaining a typical conventional laser scribing method of a glass plate.

In the second exemplary embodiment of the present invention, the plurality of irradiating laser beams are formed by a beam splitter instead of using a plurality of laser oscillators. The beam splitter may be same in construction as that shown in FIG. 4, However, the output beams thereof are not overlapped with each other, different from that in FIG. 3.

In this embodiment, a laser beam B emitted from a laser oscillator is irradiated and transmitted into the beam splitter 14. Then, the laser beam B is split into eight outgoing laser beams b1 to b8. Three outgoing laser beams b1 to b3 are appropriated as the initial heating laser beams 19, 191 and 192 illustrated in FIGS. 7A to 7C, and five laser beams b4 to b8 are appropriated as the temperature holding laser beams 20, 201 and 202 illustrated in FIGS. 7A to 7C. Each of the output powers of the outgoing laser beams b1 to b3 corresponding to the initial heating laser beams is adjusted or controlled to have high power density in comparison with the five laser beams b4 to b8 corresponding to the temperature holding laser beams. That is to say, both of the initial heating laser beam and the temperature holding laser beam according to the present invention are obtainable by a multi-point arrangement of the laser beams.

The explanations concerning constructions and behaviors of the second exemplary embodiment except the laser beam construction described above are same as that of the first exemplary embodiment, and therefore the explanation is omitted.

Figure 4:
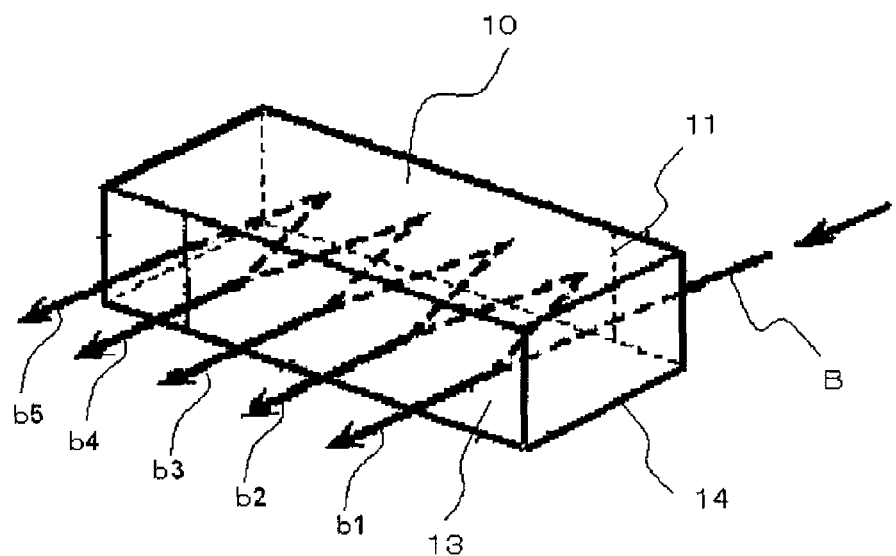
FIG. 4 is a conceptualistic perspective view of a beam splitter forming a plurality of laser beams employed in the conventional laser scribing method shown in FIG. 3.

In the multi-point arrangement of the laser beams, the laser power intensity of each of the laser beams b1 to b8 is gradually lowered as reflection repeats on a partial reflective surface of the beam splitter from b1 to b8, in the case of the reflective index of the partial reflective surface 13 in FIG. 4. However, it is possible to adjust or control the laser power intensity of each of the laser beams b1 to b8 by controlling the reflective index of corresponding partial reflective surface 13 for each of the laser beams b1 to b8 by appropriate processing the surface of the corresponding partial reflective surface 13.

According to the present invention, it is possible to increase scribing speed remarkably in comparison with the conventional art while maintaining the high quality of the thermal stress scribing of the conventional method. For example, the maximum scribing speed by conventional laser scribing equipment with $CO_2$ laser oscillator having output power of 100 W provided by an applicant is about 400 mm/sec. On the contrary, the laser scribing equipment according to the present invention is able to realize the scribing speed of more than 800 mm/sec.

As described above, the high speed laser scribing method according to the present invention has many distinguishable features as follows.

1) Higher scribing speed for glass and other fragile materials.
2) Absence of generation of micro cracks during processing.
3) Absence of generation of cullet and other contaminants during processing.
4) Higher geometrical accuracy of scribing.
5) Higher vertical scribed surface to glass surface.
6) Higher scribed surface quality: as good as a mirror finished surface.

Therefore, the present invention is suitable for applying to scribing flat display glasses such as liquid crystal display TV or plasma display TV, display glass for mobile terminals such as mobile phones, high quality requested fragile materials for various electronics parts such as fused quartz plates, ceramics plates and semiconductor plates, and so on.

What is claimed is:

1. A method for scribing fragile material comprising the steps of;
   irradiating laser beam onto a work plate of the fragile material,
   heating the work plate by absorption of the irradiated laser beam and generating thermal stress by the heating, wherein
   the laser beam is formed by a plurality of laser beam groups arranged along a beam scanning direction on a same line, and
   adjusting independently the laser beam intensity corresponding to each of the laser beam groups.

2. A method for scribing fragile material according to claim 1, wherein the plurality of laser beam groups are divided in two groups,
   wherein the laser beam intensity of one of the groups is controlled to perform initial heating to raise the temperature of the work plate, and
   the laser beam intensity of the other of the two groups is separately controlled to perform holding of the temperature of the work plate.

3. A method for scribing fragile material according to claim 2, wherein each of the two laser beam groups is obtained by a laser beam emitted from an individual laser oscillator.

4. A method for scribing fragile material according to claim 2, wherein each of the two laser beam groups is obtained by multi-point arrangement of the laser beams each emitted from a beam splitter to which a single laser beam is incident from a single laser oscillator.

5. A method for scribing fragile material according to claim 2, wherein each of the laser beams of two laser beam groups is generated by a laser oscillator circuit, the laser oscillator circuit comprising a laser oscillator, a driver for driving the laser oscillator and a power meter for monitoring output power of the laser oscillator connected with each other to form a feedback loop for controlling laser output power.

6. A method for scribing fragile material according to claim 1, wherein cooling process is further provided for cooling a certain area of the work plate on the laser beam scanning line apart behind the heated region of the work plate by a coolant.

7. A method for scribing fragile material according to claim 1, wherein bending stress is applied to the work plate along a beam scanning direction on a same line after heating the work plate by laser beam irradiation.

8. A method for scribing fragile material comprising the steps of;
- irradiating laser beam onto a work plate of the fragile material,
- heating the work plate by absorption of the irradiated laser beam and generating thermal stress by the heating, wherein
- the laser beam is formed by a first laser beam for initial heating of the work plate and a second laser beam for temperature holding of the work plate,
- adjusting the laser output power intensity of the first laser beam to be larger than that of the second laser beam by adjusting independently the laser beam intensity of each of the first laser beam and the second laser beam; and
- the first laser beam and the second laser beam are arranged in such a manner that they are not overlapped with each other along a beam scanning direction on a same line of the work plate when irradiated on the work plate.

9. A method for scribing fragile material according to claim 8, wherein each of the each of the first and second laser beam is obtained by a laser beam emitted from an individual laser oscillator.

10. A method for scribing fragile material according to claim 8, wherein each of the first and second laser beam is obtained by multi-point arrangement of the laser beams each emitted from a beam splitter to which a single laser beam is incident from a single laser oscillator.

11. A method for scribing fragile material according to claim 8, wherein each of the first and second laser beams generated by a laser oscillator circuit, the laser oscillator circuit comprising a laser oscillator, a driver for driving the laser oscillator and a power meter for monitoring output power of the laser oscillator connected with each other to form a feedback loop for controlling laser output power.

12. A method for scribing fragile material according to claim 8, wherein cooling process is further provided for cooling a certain area of the work plate on the laser beam scanning line apart behind the heated region of the work plate by a coolant.

13. A method for scribing fragile material according to claim 8, wherein bending stress is applied to the work plate along a beam scanning direction on a same line after heating the work plate by laser beam irradiation.

* * * * *